US011129336B2

(12) United States Patent
Bennett et al.

(10) Patent No.: US 11,129,336 B2
(45) Date of Patent: Sep. 28, 2021

(54) DUAL ROTOR BALE PROCESSOR FOR PRODUCING FORAGE MATERIAL AND BEDDING FROM BALES OF MATERIALS

(71) Applicant: DuraTech Industries International, Inc., Jamestown, ND (US)

(72) Inventors: Patrick Bennett, Jamestown, ND (US); Nicholas Fayville, Cleveland, ND (US)

(73) Assignee: DURATECH INDUSTRIES INTERNATIONAL, INC., Jamestown, ND (US)

( * ) Notice: Subject to any disclaimer, the term of this patent is extended or adjusted under 35 U.S.C. 154(b) by 212 days.

(21) Appl. No.: 16/400,811

(22) Filed: May 1, 2019

(65) Prior Publication Data

US 2019/0335672 A1    Nov. 7, 2019

Related U.S. Application Data

(60) Provisional application No. 62/665,788, filed on May 2, 2018.

(51) Int. Cl.
*A01F 29/00* (2006.01)
*A01F 29/12* (2006.01)
(Continued)

(52) U.S. Cl.
CPC ............ *A01F 29/005* (2013.01); *A01F 29/06* (2013.01); *A01F 29/12* (2013.01); *A01F 29/01* (2013.01)

(58) Field of Classification Search
CPC ........ A01F 29/12; A01F 29/005; A01F 29/06; A01F 29/01
(Continued)

(56) References Cited

U.S. PATENT DOCUMENTS 3,509,924 A    5/1970  Newhouse, Jr.
3,545,504 A    12/1970 Ferrari
(Continued)

FOREIGN PATENT DOCUMENTS

EP    0659333 B1    3/2000
EP    2374347 A1 * 10/2011  ........... A01F 29/005

OTHER PUBLICATIONS

International Search Report and Written Opinion issued in International Application No. PCT/US2019/030239, dated Aug. 15, 2019.

*Primary Examiner* — Adam J Eiseman
*Assistant Examiner* — Bobby Yeonjin Kim
(74) *Attorney, Agent, or Firm* — Westman, Champlin & Koehler, P.A.; Z. Peter Sawicki; Amanda M. Prose (57) ABSTRACT

A dual rotary cutter bale processor operable in a first mode for producing ground material and dispersing ground material for a first use and a second mode for producing cut material and dispersing cut material from the processor for a second use, where the cut material is coarser than the ground material. Material is processed for feeding into a container, bunk, or tire, into windrows on the ground, making piles of material, spreading the material for use as animal bedding, and/or mulching newly seeded areas. A screen and moveable bypass door for each rotary cutter and a position of a deflector direct a cut path such that the bypass doors can be used to force the material through the screens to further reduce size of the material or the deflectors can be used so the material bypasses the screens for dispersal from the processor in a coarser state.

17 Claims, 7 Drawing Sheets

(51) Int. Cl.
*A01F 29/06* (2006.01)
*A01F 29/01* (2006.01)

(58) Field of Classification Search
USPC .......................................................... 241/605
See application file for complete search history.

(56) References Cited

U.S. PATENT DOCUMENTS

| | | | |
|---|---|---|---|
| 3,621,895 A | 11/1971 | Leidig et al. | |
| 3,675,696 A | 7/1972 | Weichel | |
| 3,726,208 A | 4/1973 | Brengman et al. | |
| 3,863,085 A | 1/1975 | Shapiro et al. | |
| 3,863,850 A | 2/1975 | Freeman | |
| 3,915,392 A | 10/1975 | Kugler | |
| 3,999,674 A | 12/1976 | Meitl | |
| 4,101,081 A | 7/1978 | Ritter et al. | |
| 4,123,489 A | 10/1978 | Kelley | |
| 4,183,472 A | 1/1980 | Packard et al. | |
| 4,227,654 A | 10/1980 | Seefeld | |
| 4,376,607 A | 3/1983 | Gibson | |
| 4,390,312 A | 6/1983 | Skeem | |
| 4,428,537 A | 1/1984 | von der Heide | |
| 4,448,361 A | 5/1984 | Marcy | |
| 4,449,672 A | 5/1984 | Morlock et al. | |
| 4,524,916 A * | 6/1985 | Keyes | A01D 87/127 241/101.76 |
| 4,538,948 A | 9/1985 | Melton | |
| 4,597,703 A | 7/1986 | Bartolini | |
| 4,657,191 A * | 4/1987 | Dwyer | A01D 87/127 241/101.762 |
| 4,779,810 A | 10/1988 | Frey | |
| 4,787,797 A | 11/1988 | Harper | |
| 4,789,289 A | 12/1988 | Wilson | |
| 4,790,489 A | 12/1988 | Paul | |
| 4,830,292 A | 5/1989 | Frey | |
| 4,892,259 A | 1/1990 | von der Heide | |
| 4,923,128 A | 5/1990 | Ostrowski | |
| 4,951,883 A | 8/1990 | Loppoli et al. | |
| 4,966,332 A | 10/1990 | Laska | |
| 4,982,658 A | 1/1991 | Knudson | |
| 4,993,648 A | 2/1991 | Torp | |
| 5,025,992 A | 6/1991 | Niebur | |
| 5,033,683 A | 7/1991 | Taylor | |
| 5,035,166 A | 7/1991 | Carlson et al. | |
| 5,062,757 A | 11/1991 | Eichenauer | |
| 5,069,165 A | 12/1991 | Rousseau | |
| 5,071,079 A | 12/1991 | Fykse et al. | |
| 5,090,630 A | 2/1992 | Kopecky et al. | |
| 5,099,755 A | 3/1992 | Montano et al. | |
| 5,107,738 A | 4/1992 | Aoyagi | |
| 5,181,663 A | 1/1993 | Dorscht et al. | |
| 5,203,658 A | 4/1993 | Henderson | |
| 5,205,496 A | 4/1993 | O'Donnell et al. | |
| 5,209,412 A | 5/1993 | Dwyer et al. | |
| 5,209,413 A | 5/1993 | Dwyer et al. | |
| 5,211,345 A | 5/1993 | Siebenga | |
| 5,215,266 A | 6/1993 | Zimmerman | |
| 5,249,359 A | 10/1993 | Schubert et al. | |
| 5,255,867 A | 10/1993 | Whittleton | |
| 5,340,040 A * | 8/1994 | Bussiere | A01F 29/005 241/101.761 |
| 5,556,041 A | 9/1996 | Cheesman et al. | |
| 5,573,190 A | 11/1996 | Goossen | |
| 5,601,241 A | 2/1997 | Brewster | |
| 5,653,394 A | 8/1997 | Bussiere et al. | |
| 5,730,375 A | 3/1998 | Cranfill et al. | |
| 6,109,553 A | 8/2000 | Hruska | |
| 6,202,950 B1 | 3/2001 | Hruska | |
| 6,244,144 B1 | 6/2001 | Goldie et al. | |
| 6,338,829 B1 | 1/2002 | Kodama et al. | |
| 6,343,755 B1 | 2/2002 | Barclay et al. | |
| 6,375,104 B1 | 4/2002 | Hruska | |
| 7,172,147 B2 | 2/2007 | Diemunsch | |
| 7,651,043 B2 | 1/2010 | Hoovestol | |
| 7,793,873 B2 | 9/2010 | Hoovestol | |
| 7,895,944 B2 | 3/2011 | Derstine et al. | |
| 8,066,208 B2 * | 11/2011 | Bennett | A01F 29/005 241/30 |
| 8,474,740 B2 | 7/2013 | Neudorf et al. | |
| 2006/0175445 A1 | 8/2006 | Hoovestol | |
| 2007/0290087 A1 * | 12/2007 | Weiss | B02C 18/184 241/101.76 |
| 2009/0288608 A1 | 11/2009 | Dalton | |
| 2010/0219275 A1 | 9/2010 | Weiss | |
| 2013/0193247 A1 | 8/2013 | Graham | |
| 2018/0049372 A1 * | 2/2018 | Matousek | A01F 29/12 |

\* cited by examiner

DUAL ROTOR BALE PROCESSOR FOR PRODUCING FORAGE MATERIAL AND BEDDING FROM BALES OF MATERIALS

CROSS-REFERENCE TO RELATED APPLICATION

The present application is based on and claims the benefit of U.S. provisional patent application Ser. No. 62/665,788, filed May 2, 2018, the content of which is hereby incorporated by reference in its entirety.

BACKGROUND

This disclosure relates to bale processors and in particular to bale processors for shredding material for bedding and forage materials.

Livestock producers utilize large round or rectangular bales to provide forage material and bedding for livestock. Bale processors are used to shred the material forming the bale whether it is alfalfa, hay or other forage-type material or material used for bedding.

A typical forage bale processor generally has a rotary grinder positioned at a bottom of an enclosure for engaging the bales of material for shredding and discharging the material onto the ground for feeding livestock.

When a bale of material is of a quality or type not suitable for feeding livestock, the ground material may be used as bedding. Such bale processors widely disperse the shredding from the bale onto the area where the cattle bed down.

One limitation of prior art processors is that a different piece of equipment has to be used to grind forage material and a different piece of equipment has to be used to grind a bale of bedding material. Prior art bale processors can be used for feeding and bedding but the length of the cut can only be changed by a small amount limited by moving the slug bars. Bale processors of the prior art have limited abilities for outputting chopped material at different lengths as described in U.S. Pat. No. 9,769,987 B2. Some prior art bale processors use a second cutter to regrind the material to make it finer.

SUMMARY

An aspect of the present disclosure relates to a dual rotor bale processor configured to operate in a first mode for producing a shredded material and dispersing the shredded material in a windrow or into a bunk feeding and to operate in a second mode for producing a cut material and dispersing the cut material in a coarser state from the processor for use as bedding. Another aspect of the present disclosure relates to a machine for processing bales of material for forage and/or livestock bedding comprising an enclosure configured to receive bales of material for processing and a first and a second rotary cutter positioned within the enclosure for processing the bales of materials. The machine comprises a first and a second screen wherein one screen is positioned at least partially around one of the first or second rotary cutters and wherein the first and second screens each have a plurality of openings and a first and a second deflector door associated with the screens. Each door is movable between a first position for directing the material from the first and second rotary cutters to and through the openings in one of the first or second screens and a second position where the material bypasses the first and second screens for discharging the material from the enclosure.

Another aspect of the present disclosure relates to a method of processing bales of material for forage and/or livestock bedding comprising providing one or more bales of material to an enclosure having a first and a second cutter mechanism positioned therein and feeding the one or more bales through the first and second cutter mechanisms and processing the material to a first size. The method further comprises moving a first and a second bypass door to a first position for directing the material from at least one of the first and second rotary cutters to and through at least one of a first or second screens for further processing the material or to a second position for bypassing at least one of the first and second screens. The method then comprises discharging the processed material from the enclosure.

Moving the first and second bypass doors concurrently to an extended position for directing the processed material from the first and second cutters through the first and second screens allows for further processing of the material and discharging the material as a forage material for livestock. The forage material may be discharged from a lower portion of the machine.

Alternatively, moving the first and second bypass doors concurrently to a retracted position for bypassing the first and second screen directs the processed material from the first and second cutter to a discharge opening for discharging the material as a bedding material for livestock. The discharge opening may be near the top or middle of the enclosure allowing the bedding material to be dispersed or sprayed from the cutters.

Another aspect of the present disclosure relates to a machine for processing bales of material for use as forage material or livestock bedding comprising an enclosure having a first and a second sidewall opening, wherein the first sidewall opening is an opening for receiving the bales of material for processing and wherein the second sidewall opening is an opening allowing for dispersing the processed material from the enclosure. The enclosure supports a plurality of cutting mechanisms positioned within the enclosure for processing the bales of materials through the machine. The first and second cutting mechanisms are arranged in a vertical relationship with respect to one another. A plurality of screens are provided, wherein each of the plurality of screens is positioned between at least one of the cutting mechanisms and the second sidewall opening in the enclosure along with a plurality of movable doors. Each door is movable between a first position and a second position, wherein in the first position, the doors are extended to a position between at least one screen and the second sidewall opening in the enclosure and in the second position, the doors are retracted to a position above a respective cutting mechanism.

While the embodiments described below are directed to a bale processor having a cutting mechanism comprised of two rotary cutters, another aspect of the present disclosure relates to relates to a machine for processing bales of material having a single rotary cutter. The machine processes the bales of material for forage and/or livestock bedding and comprising an enclosure configured to receive bales of material for processing and a single, large capacity rotary cutter positioned within the enclosure for processing the bales of materials. The machine comprises a first and a second screen wherein one the screens are positioned vertically with respect to one another and the screens are positioned to at least partially surround a side of the rotary cutter. The screens each have a plurality of openings and a first and a second bypass door associated with the screens. Each door is movable between a first position for directing the material from the rotary cutter to and through the openings in one of the first or second screens and a second position where the material bypasses the first and second screens for discharging the material from the enclosure.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments

DETAILED DESCRIPTION

The present disclosure relates to a farm implement for processing a material, such as a bale of forage or bedding material. The implement is a dual rotor bale processor. The bale processor is configured to process (e.g., cut, shred and/or grind) a bale of material for use as feed and/or for use as bedding. The bale processor is operable to grind bales of material, such as forage material, and to discharge the ground material from the bale processor. In one operational mode, the bale processor is configured to discharge the material from the processor in a manner such as for windrow feeding or otherwise provide the ground material to a trough or other area for bunk feeding. In a second operational mode, the bale processor is configured to discharge the material from the processor in a manner for dispersing the material as bedding, where the discharged material is dispersed over a surface and in a coarser ground state or otherwise directed to an area away from the processor.

Figure 1:
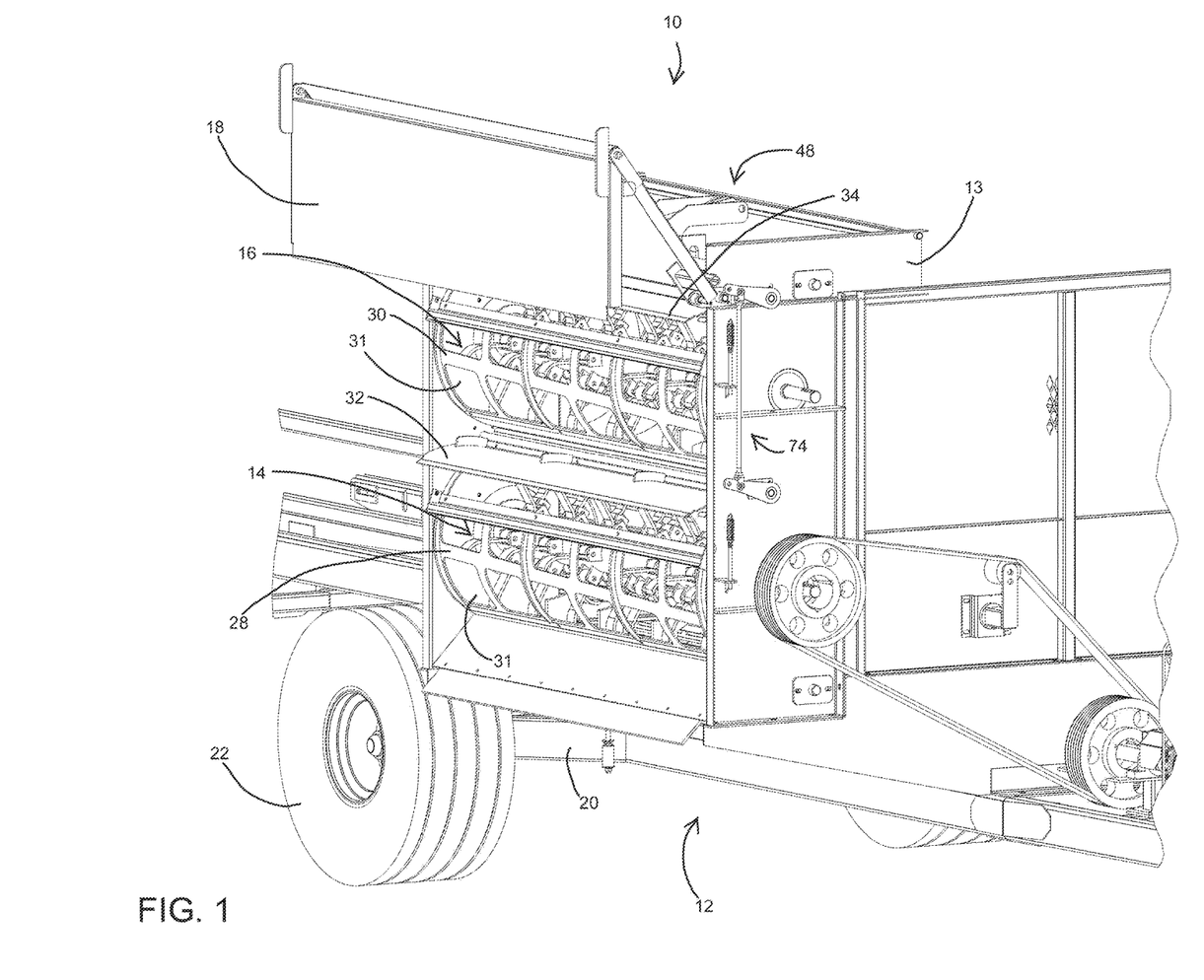
FIG. 1 is a side perspective view of a discharge side of the bale processor with screens and with deflectors in a retracted position.
Figure 2:
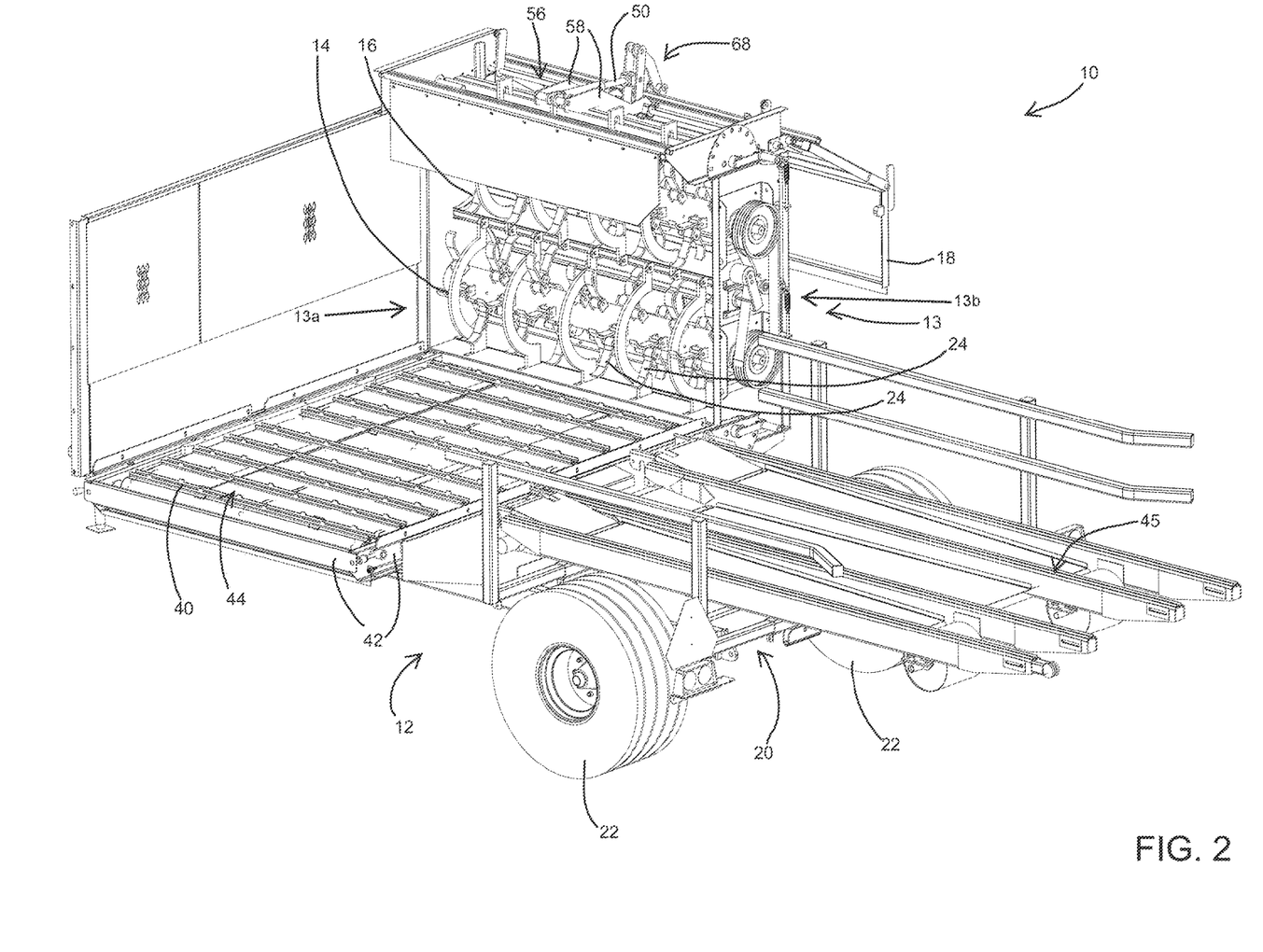
FIG. 2 is a side perspective view of a loading side of the bale processor.

A bale processor 10 of the present disclosure is generally illustrated in the figures. The bale processor 10 includes a frame 12 that supports an enclosure 13. The frame 12 can be supported by one or more axles 20 supporting pairs of ground engaging wheels 22 rotatable to move the bale processor 10 when the frame 12 is towed by a mover, such as a tractor. The enclosure 13 supports a first material cutter 14 and a second material cutter 16 such that bales of material can be fed into the cutters 14, 16 and ground material can be dispensed therefrom after cutting and/or shredding of the material. As illustrated in FIG. 1, the enclosure 13 has two opposing sidewalls having openings 13a and 13b and the enclosure 13 is equipped with a deflector 18. The deflector 18 is a hinged deflector 18 having an upper section 18a and a lower section 18b coupled by a hinge. The deflector 18 can be partially and substantially closed over a discharge opening in one of the sidewalls of the enclosure 13 where the plurality of cutters 14, 16 are positioned in proximity to the deflector 18.

In the embodiment illustrated, the material cutters 14, 16 are horizontally disposed. As illustrated in the figures, the cutters 14, 16 are arranged in a vertical relationship with respect to one another. In this arrangement, the cutters 14, 16 each have a plurality of cutting arms 24 that are hingedly fixed to a rotating bar or cylinder 26 which extends across the enclosure 13. The cutters 14, 16 are configured such that the cylinder 26 rotates and thus moves the plurality of cutting arms 24 secured thereto in an upward direction with respect to a point of engagement of the arms with the bale of material received for cutting. This moves the cut material through the processor upwardly through the cutters 14, 16 around a top of the cutters 14, 16 towards the discharge opening in the sidewall of the enclosure 13. On occasion, the rotary cutters 14, 16 will be referred to as rotary cutters herein.

The cutters 14, 16 in the embodiment illustrated are also configured for cutting in an "upward" direction, that is the cutters 14, 16 are positioned in the enclosure and facing outwardly such that the cutters 14, 16 rotate and lift the material upwardly and away from a floor of the enclosure preventing trapping of the cut material on the floor of the housing. However, the cutters 14, 16 may also be configured for cutting in a "downward" direction or configured to counter rotate for lifting the material into the processor 10 and processing the material through the processor 10.

The bale cutter 10 may further include one or more screens for further shredding the material. As illustrated in FIG. 1, a first screen 28 and a second screen 30 are provided in close proximity to the cutters 14, 16 respectively. The screens 28, 30 are fixedly secured (e.g., bolted or otherwise securely fastened) within or to the enclosure 13. The screens 28, 30 are positioned to at least partially surround the respective cutters 14, 16 and cutting arms 24. The screens 28, 30 each have a plurality of openings 31 therein. The openings 31 may be of approximately the same size or of varying sizes and screens having various sized openings may be used or interchanged. For example, a screen may be selected based on the size of the openings by a user for various reasons including but not limited to the type of bale material and/or the type of livestock requiring forage material and/or bedding selected.

The screens 28, 30 provide a mechanism for further grinding, shredding, cutting or otherwise further reducing the size of material having passed through the cutter 14, 16 (e.g., the ground or cut bale material). The screens 28, 30 are used in cooperation with the cutters 14, 16 to further reduce the size the ground or cut bale material when producing forage material for bunk feeding, windrowing or otherwise when a finer cut is desired. Additionally or alternatively, the screen(s) 28, 30 can be bypassed for producing bedding for livestock, and/or otherwise when a courser cut of material is needed.

The bale cutter 10 is also equipped with a first and a second bypass door 32, 34. The bypass doors 32, 24 are movable between a retracted and an extended position and are operably secured at least partially within the enclosure 13. The first bypass door 32 may be a lower bypass door that is positioned generally above the first cutter 14 and configured to close down over at least a portion of the first cutter 14 when in the extended position. The second bypass door 34 may be an upper bypass door that is positioned above the second cutter 16 and configured to close down over at least a portion of the second cutter 16 when in the extended position.

When extended, the bypass doors 32, 34 are extended down and over at least a portion of the cutter 14, 16 for forcing the cut material from the cutter 14, 16 through the openings 31 in the respective screen 28, 30 to further reduce the size of the material. The cutters 14, 16 move the material upwardly and the path of the cut material is then directed downwardly and/or outwardly through the screen 28, 30 by the bypass door 32, 34. The material is then discharged through a section of the sidewall of the bale processor 10 which may be a lower section of the sidewall for purposes such as using the processor 10 for windrowing or bunk feeding the more finely ground forage material. When the bypass doors 32, 34 are extended, the deflector 18 is generally also in a partially closed position over the sidewall, allowing the forage material to be discharged through a lower area of the sidewall of the bale processor 10 for purposes such as dispersing the more finely cut forage material in long, straight lines or piles.

When retracted, the bypass doors 32, 34 are positioned up and/or over an upper area of the respective cutter 14, 16, thus exposing an opening 15, 17 above each cutter 14, 16 where the upwardly rotating cutter 14, 16 moves the material through the cutters 14, 16 and over an upper edge of the respective screen 28, 30 to effectively bypass the screen 28, 30 and discharge the material by dispersing the bedding material to a location spaced apart from the processor 10. When the bypass doors 32, 34 are retracted, the deflector 18 is generally also in an open position, allowing the bedding material to be discharged through a lower, middle and/or upper area of the sidewall of the bale processor 10 for purposes such as dispersing the more coarsely cut bedding material.

Figure 3:
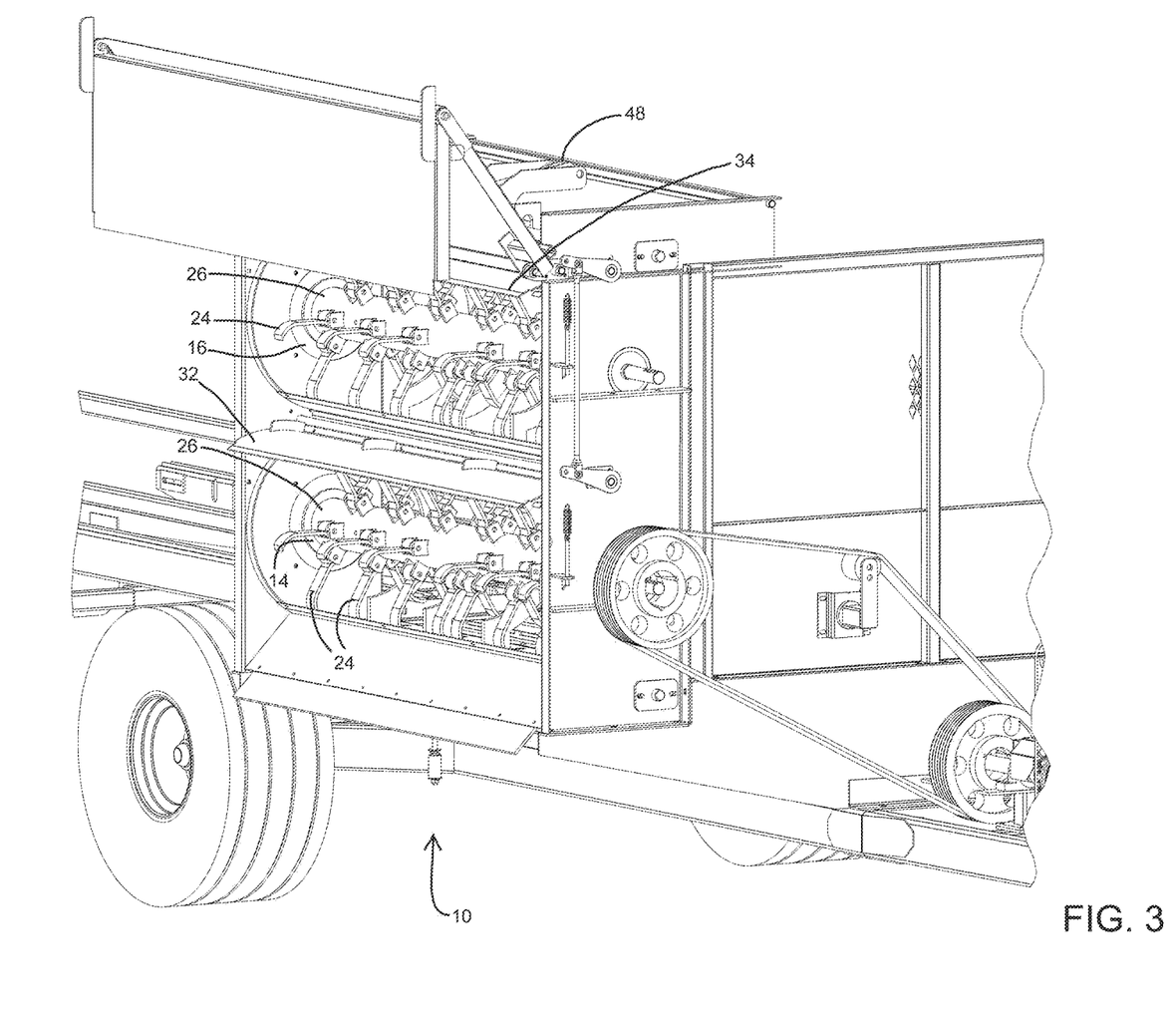
FIG. 3 is a side perspective of the discharge side of the bale processor with a cover in an open position and the screens removed.
Figure 4:
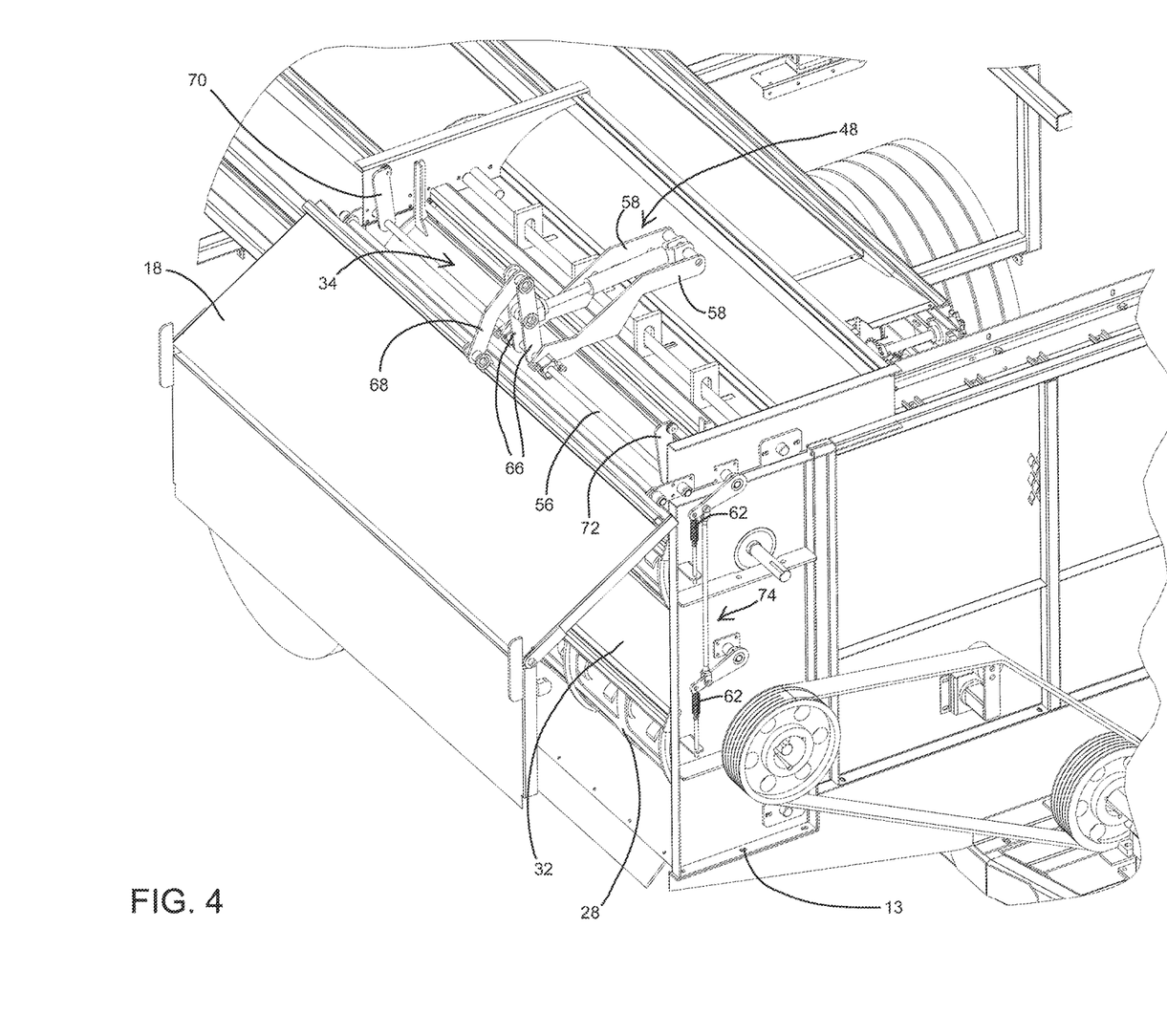
FIG. 4 is a top perspective view of the bale processor.
Figure 5:
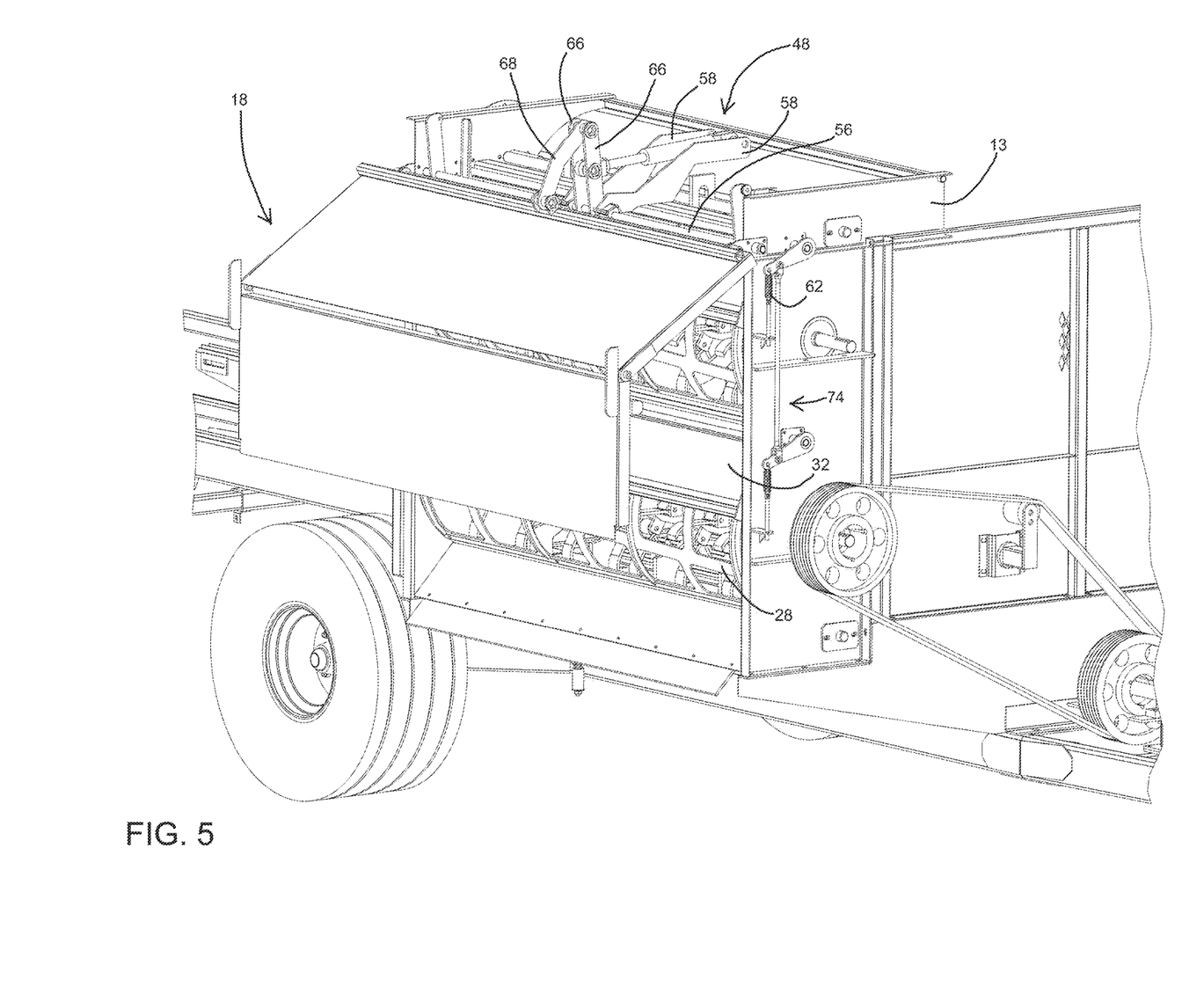
FIG. 5 is a side perspective view of the discharge side of the bale processor with cover in a partially extended position and with rotor screens in place.

In further detail, the bypass doors 32, 34 are movable between a bypass position as illustrated in FIGS. 1 and 3 and a deflecting position as illustrated in FIGS. 4 and 5. Referring to FIG. 5, the bypass doors 32, 34 effectively push or force the cut material from the respective cutter 14, 16 through the respective screen 28, 30 wherein the screens retain material to large to pass there through and the cutters further cut or reduce the size of the material. The screens also deflect the ground material downwardly for discharging a feed line or supply, while the cutters 14 and 16 are rotating the arms 24 upwardly for cutting. When the bypass doors 32, 34 are in the open or bypass position as illustrated in FIG. 1, the material bypasses the respective screens 28, 30 without being further cut or shredded and this cut material then has a larger size than the material processed through the cutters 14, 16 and screens 28, 30. This more coarse material, having bypassed the screens 28, 30 can then be discharged, dispersed and/or sprayed outwardly from the bale processor 10 for purposes of covering a surface as livestock bedding, mulching newly seeded areas, or otherwise discharged into a pile.

The deflector 18 is retracted and/or extended by a retraction mechanism 48 that is operably secured to the upper deflector 18a and is supported by the enclosure 13. The mechanism 48 is operably secured to the bypass doors 32, 34 such that operation of the mechanism 48 can effectively move the deflector doors 32, 34 between the retracted and extended positions and moves the deflector 18 between an open or "folded up" and a closed position. That is, when the doors 32, 34 are retracted and the deflector 18 is folded up into to an open position, the material can be blown out of the processor 10 for bedding. The deflector 18 is partially closed over the sidewall when the doors 32, 34 and in the fully extended position for forcing the material from the cutters 14, 16 through the screens 28, 30 and down towards a ground surface or into a bunk for feeding. The fully extended positions can also be used for transport of the bale processor 10. The bypass doors 32, 34 and deflector 18 are moveable for use in positions between fully extended and fully retracted.

As illustrated in FIGS. 4 and 5, the mechanism 48 is a hydraulic mechanism where a hydraulic cylinder 50 is operably connected to the deflector 18 and the upper bypass door 32 through a series of linkages. For example, the deflector 18 is operably secured to the cylinder 50 via a first link 54. The first link 54 operably attaches the upper deflector 18a, the deflector 18, and the hydraulic cylinder 50 to the shaft 56 via straps 66. The straps 66 are spaced apart parallel to one another and are secured to a shaft 56 on a first end of the straps 66. A second opposing end of each strap 66 is also secured to a deflector arm 68 that is secured to the deflector 18, thus operably connecting the straps 66 and thus the hydraulic cylinder 50. The straps 66 are operably secured to hydraulic cylinder 50 at a location along the length of the straps 66.

Also attached to the shaft 56 is a pair of arms 70, 72, where each arm 70, 72 has a cam follower bearing mounted to it. As the shaft 56 rotates, the bearings that are mounted to the arms 70, 72 move against a pair of flat cam plates that are mounted on the upper bypass door 34. When the bearing pushes against the plates this causes the upper bypass door 34 to open. The arms 70, 72 are positioned on opposite ends of the shaft 56 as the shaft 56 extends across the enclosure 13 and co-extends with the deflector 18. The arms 70, 72 support the connection of the shaft 56 to the enclosure and movement of the bypass door 34. The upper and lower doors 32, 34 are operably attached to each other through parallel linkages 74. The parallel linkages 74 extend to vertically connect the bypass doors 32, 34 for retraction and extension in concert such that the bypass doors 32, 34 are movable together, as a pair. The bypass doors 32, 34, when extended and lowered are pulled closed by a pair of springs 62. Further, retracting or extending the bypass doors 32, 34, the hydraulic connection similarly retracts or extends the deflector 18 moving the deflector between an open and a closed position along with the doors 32, 34.

The extent of the cutting, grinding or shredding of the bale material for use as forage material or bedding can be adjusted. For example, the rotary cutters 14, 16 may also have a slug bar(s) that control(s) the size by a depth (or length) of the cut material from the bale. A support bar (not shown) may be positioned approximately halfway between the two rotary cutters 14, 16 and extends across the enclosure 13, where this bar separates the cutters 14, 16. Extending upwardly and/or downwardly from the bar are a plurality of curved arms. The curved arms provide a slug bar, for example having four upwardly and five downwardly positioned crescent shaped bars. This slug bar prevents an excess of the material from entering the cutter so that a user can selectively control cutting or grinding of bales of material. The arms are moveable on the top or bottom, and are pivotal at or near a middle of the enclosure 13 for adjustment. The adjustment of these arms controls how much of the cutter 14, 16 is exposed to the bale.

The bale processor 10 is also configured to load round bales and/or square bales for cutting. The bale processor will also cut large bales, bales so large that a bale engages both cutters at the same time. Such is possible since each cutter is independent of the the pother cutter. The frame 12 can also support a loading table 20 and a feeding conveyor 40. The loading table 20 can be a tilting loading table 20 and the feeding conveyor 40 moves the material sideways into the cutters 14, 16. The loading table 20 includes a plurality of beams 45 spaced apart around the edge of the frame 12 and moving chains 44 which lift the bale off of a ground surface and/or push the bale onto the feeding conveyor 40 and/or towards and into the cutters 14, 16.

The feeding conveyor 40 cooperates with the cutting rotors 14, 16. When the bales of material are fed to the enclosure 13 for cutting, shredding, or grinding, the cutting rotors 14, 16 cooperate with the feed table to also rotate the bales of material for more efficient processing. The cutters 14, 16 also generate an airflow through the enclosure sufficient to prevent ground particles and/or debris from gathering in mass at or near the floor of the enclosure away from the cutters.

Each cutter 14, 16 is configured to discharge the ground material independently from the other cutter 14, 16. The ground material is discharged from the bale processor 10, for example, out of the side of the processor 10 when the deflector 18 is opened. The deflector 18 can be at least partially closed to aid in windrowing the ground material or can be closed for purposes of transport of the bale processor 10.

Figure 6:
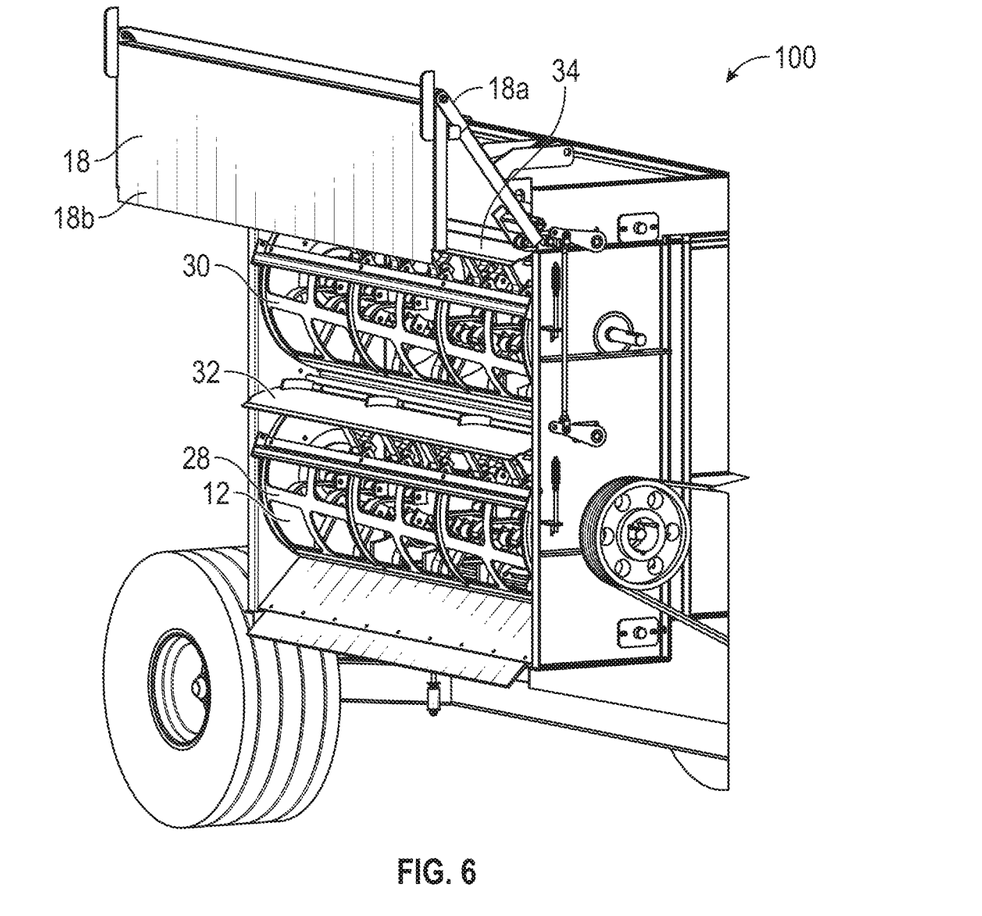
FIG. 6 is a side perspective view of a discharge side of an alternative embodiment of the bale processor having a single rotor and with screens and with deflectors in a retracted position.
Figure 7:
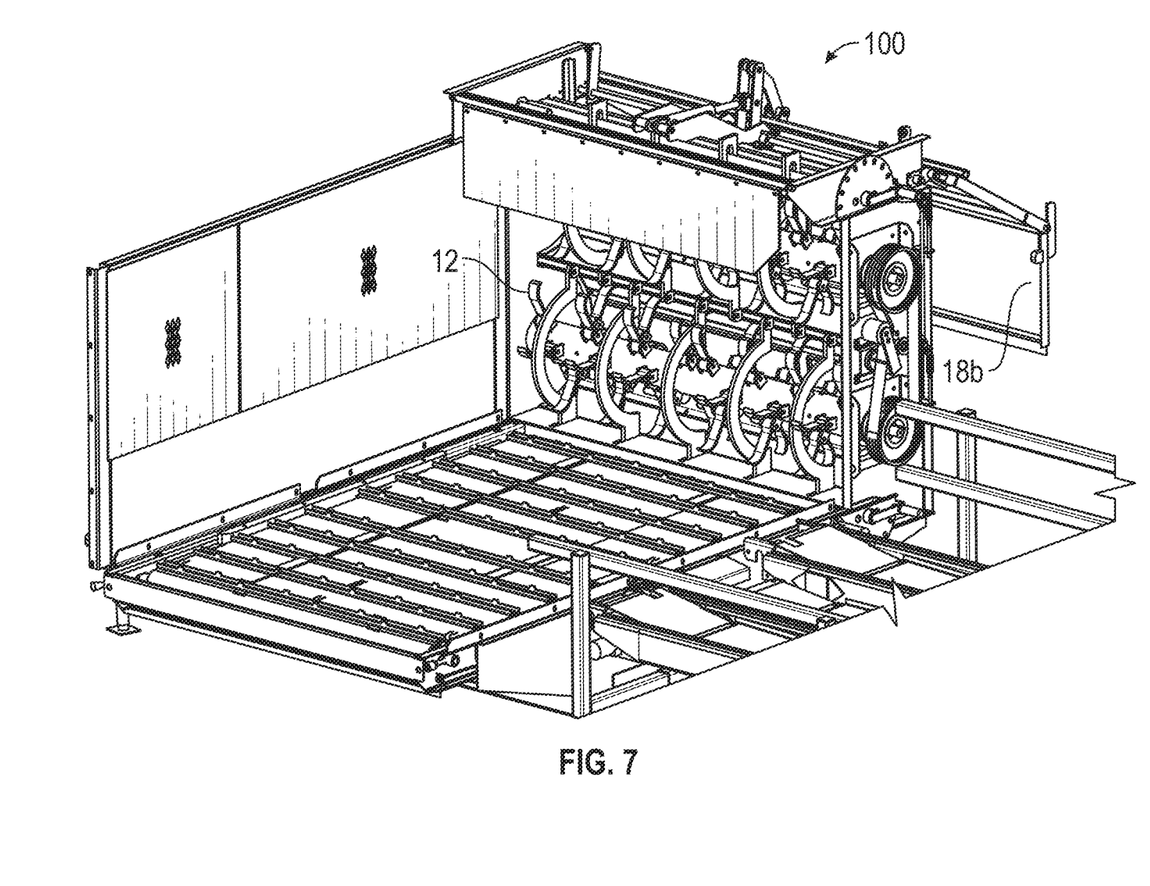
FIG. 7 is a side perspective view of a loading side of the alternative embodiment of the bale processor with components other than the cutting mechanism removed for clarity.

An additional embodiment is illustrated in FIGS. 6 and 7 wherein the bale processor 100 comprises an enclosure configured to receive bales of material for processing and a single, large capacity rotary cutter 120 positioned within the enclosure for processing the bales of materials. Similarly to the dual rotor processor 120, the processor 100 comprises a first 28 or a first 28 and second screen 28, 30. When a single screen is used, the one screen 28 is positioned vertically along the side of the rotary cutter 120 and is a larger screen coextending with the rotary cutter 120. If two screens 28, 30 used, they are positioned vertically with respect to one another and the screens 28, 30 are positioned to at least partially surround a side of the rotary cutter 120. The screen(s) 28, 30 have a plurality of openings and a first and a second bypass door 32, 34 associated with the screen(s) 28, 30. Each door 32, 34 is movable between a first position for directing the material from the rotary cutter to and through the openings in one of the first or second screens and a second position where the material bypasses the first and second screens 28, 30 for discharging the material from the enclosure.

It is also contemplated that the dual rotor bale processor 10 described herein can be operated with the screens 28, 30 removed. In this embodiment, the bypass doors 32, 34 will not interfere with the operation of the cutters 14, 16 or the processor 10. The bypass doors 32, 34 are still movable for purposes of dispensing forage material and/or bedding from the processor 10.

Although the present disclosure has been described with reference to preferred embodiments, workers skilled in the art will recognize that changes may be made in form and detail without departing from the spirit and scope of the disclosure.

The invention claimed is:

1. A machine for processing bales of material for forage and/or livestock bedding comprising:
    an enclosure configured to receive bales of material for processing;
    a rotary cutting mechanism positioned within the enclosure and for processing the bales of materials;
    a first and a second screen, wherein the first and second screens are positioned proximate the rotary cutting mechanism and wherein the first and second screens each have a plurality of openings; and
    a first and a second bypass door wherein the first and second bypass doors each are movable between a first position and a second position, wherein the first position is for directing the material from the rotary cutting mechanism to and through the openings in the first and second screens to further reduce the size of the material and direct the materials outwardly from a lower portion of the enclosure, and wherein the second position is a position for allowing the material to bypass the first and second screens and thus the material is directed from the rotary cutting mechanism and around the first and second screens for discharging coarser material from an upper portion of the enclosure.

2. The machine of claim 1, wherein the rotary cutting mechanism is configured to cut the material to a first size, and the plurality of openings in the first and second screens are configured to grind the cut material to a second size, wherein the first size is coarser than the second size.

3. The machine of claim 2, wherein the rotary cutting mechanism comprises a first and second rotary cutter and wherein the first and second rotary cutters are positioned vertically with respect to one another and are each configured to cut the material to the first size and wherein the plurality of openings in the first and second screens are configured to grind the cut material to the second size, wherein the first size is coarser than the second size.

4. The machine of claim 1, and further comprising a hinged deflector.

5. The machine of claim 1, wherein one or both of the first and second bypass doors when in the first position is configured to discharge the processed material as a windrow or into a feeder.

6. The machine of claim 1, wherein the first and the second bypass doors when in the second position are configured to disperse the processed forage material away from the housing as bedding.

7. The machine of claim 1, wherein one of the first or second bypass doors is positioned above the first rotary cutter and wherein the bypass doors are movable down and at least partially over the first or second screen, respectively.

8. The machine of claim 1, and further comprising a hydraulic mechanism operably secured to the bypass doors for retraction and extension of the bypass doors.

9. The machine of claim 8, wherein the hydraulic mechanism is also operably secured to the hinged deflector for retraction and extension of the hinged deflector for closing over a discharge port of the machine.

10. A method of processing bales of material for forage and/or livestock bedding comprising:
    providing one or more bales of material to an enclosure having a rotary cutting mechanism positioned therein, the rotary cutting mechanism comprising a first and a second bypass door, each door movable between a first position and a second position;
    feeding the one or more bales through the rotary cutting mechanism and processing the material to a first size;

moving the first and second bypass doors to the first position and directing the material from the rotary cutting mechanism to and through openings in a first screen and a second screen for further processing the material to further reduce the size of the material and directing the materials outwardly from a lower portion of the enclosure;

moving the first and second bypass doors to the second position and directing the material to bypass the first and second screens such that the material is directed from the rotary cutting mechanism and around the first and second screens and directing the materials outwardly from an upper portion of the enclosure and discharging the processed material from the enclosure.

11. The method of claim 10, wherein the rotary cutting mechanism comprises first and second rotary cutters.

12. The method of claim 10, wherein the rotary cutting mechanism comprises first and second rotary cutters, and directing the processed material into and through at least one of the first and second rotary cutters and through at least one of the first and second bypass doors in a first position and then outwardly through at least one of the first and second screens for further processing the material into ground material and discharging the material as a forage material for livestock.

13. A machine for processing bales of material for use as a forage material or livestock bedding, the machine comprising:

an enclosure having a first and a second sidewall opening, wherein the first sidewall opening is an opening for receiving the bales of material for processing and wherein the second sidewall opening is an opening allowing for dispersing the processed material from the enclosure;

at least one cutting mechanism positioned within the enclosure for processing the bales of material as the material passes from the first sidewall opening through the machine to the second sidewall opening;

a first and a second screen, wherein the first and second screens are positioned between the at least one cutting mechanism and the second sidewall opening in the enclosure; and a first and a second movable door, the first and second movable doors being movable between a first position and a second position, wherein when the first and second movable doors are in the first position, the first and second doors close to direct the processed material from the at least one cutting mechanism and through the first and second screens before being dispersed from a lower portion of the enclosure and in the second position, the first and second movable doors open and are retracted to a position above the at least one cutting mechanism to allow the processed material from the at least one cutting mechanism to bypass the first and second screens and be dispersed from an upper portion of the enclosure.

14. The method of claim 13, wherein the rotary cutting mechanism comprises a single rotary cutter or two or more rotary cutters arranged in a vertical relationship with respect to one another.

15. The machine of claim 13, and further comprising a hinged deflector movable between a first position and a second position, wherein in the first position, the hinged deflector is extended over the second sidewall opening in the enclosure and in the second position, the hinged deflector is retracted to a position at least partially above the enclosure.

16. The machine of claim 15, and further comprising a hydraulic mechanism operably connected to the hinged deflector for extension and retraction of the hinged deflector.

17. The machine of claim 14, wherein the first and second doors are operably connected for concurrent movement between the first and second positions.

\* \* \* \* \*